(12) United States Patent
Choi et al.

(10) Patent No.: US 11,584,354 B2
(45) Date of Patent: Feb. 21, 2023

(54) APPARATUS AND METHOD OF CONTROLLING A HYBRID VEHICLE

(71) Applicants: HYUNDAI MOTOR COMPANY, Seoul (KR); KIA MOTORS CORPORATION, Seoul (KR)

(72) Inventors: Yong Kak Choi, Seoul (KR); Hyun Woo Lim, Hwaseong-si (KR); Buhm Joo Suh, Hwaseong-si (KR); Jinkuk Cho, Hwaseong-si (KR); Kwanhee Lee, Suwon-si (KR); Sungchan Na, Seongnam-si (KR); Yeongseop Park, Seoul (KR); Jihyun Park, Hwaseong-si (KR); Seungwoo Hong, Seoul (KR); Dong Hee Han, Seongnam-si (KR); Hyunjin Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 319 days.

(21) Appl. No.: 16/890,767

(22) Filed: Jun. 2, 2020

(65) Prior Publication Data
US 2021/0146912 A1    May 20, 2021

(30) Foreign Application Priority Data
Nov. 20, 2019 (KR) .......................... 10-2019-0149865

(51) Int. Cl.
*B60W 20/13* (2016.01)
*B60W 20/40* (2016.01)
(Continued)

(52) U.S. Cl.
CPC ............ *B60W 20/13* (2016.01); *B60W 10/04* (2013.01); *B60W 20/30* (2013.01); *B60W 20/40* (2013.01);
(Continued)

(58) Field of Classification Search
CPC ...... B60W 10/06; B60W 20/13; B60W 10/04; B60W 20/30; B60W 20/40;
(Continued)

(56) References Cited

U.S. PATENT DOCUMENTS 5,884,477 A * 3/1999 Andou ................ F02D 41/0235
60/285
9,744,965 B2    8/2017 Choi
(Continued)

FOREIGN PATENT DOCUMENTS

CN           103707889 A  *  4/2014  ............ B60W 10/06
JP           01-036529 A  *  2/1989  ............ B60K 41/04
(Continued)

*Primary Examiner* — Mahmoud S Ismail
(74) *Attorney, Agent, or Firm* — Lempia Summerfield Katz LLC

(57) ABSTRACT

An apparatus of controlling a hybrid vehicle includes: an engine configured to generate power by combustion of fuel; a driving motor configured to assist power of the engine and selectively operate as a power generator to generate electric energy; an HSG configured to start the engine and selectively operate as a power generator to generate electric energy; a clutch provided between the engine and the driving motor; a battery configured to supply electric energy to the driving motor or charge electric energy generated in the driving motor; an EGR apparatus configured to resupply exhaust gas discharged from the engine to the engine; an electric supercharger in which outside air supplied to combustion chambers flows; and a controller configured to variably control a travelling mode, an operating point, a lock charge through the driving motor and the HSG, and a shifting pattern based on a required torque of a driver and a SOC of the battery.

16 Claims, 11 Drawing Sheets

(51) Int. Cl.
*B60W 10/04* (2006.01)
*B60W 20/30* (2016.01)

(52) U.S. Cl.
CPC . *B60W 2710/083* (2013.01); *B60W 2710/244* (2013.01)

(58) Field of Classification Search
CPC ..... B60W 2710/083; B60W 2710/244; B60W 2710/0666; B60W 10/26; B60W 10/30; B60W 20/00; B60W 20/10; B60W 20/15; B60W 10/02; B60W 10/08; B60W 10/10; B60W 20/16; B60W 30/18072; B60W 30/181; B60W 30/182; B60W 40/06; B60W 50/10; B60W 2510/0647; B60W 2510/0657; B60W 2510/083; B60W 2520/04; B60W 2530/12; B60W 2552/15; F01N 2900/08; F01N 2900/1602; F01N 3/10; F01N 9/00; Y02A 50/20; Y02T 10/40; Y02T 10/70; Y02T 10/62; Y02T 10/12; F02B 39/10; F02M 26/03; B60K 2006/4825; B60K 6/48; F02N 11/04; F02N 11/08; F02N 2011/0896; B60L 58/12; F02D 41/0007; B60Y 2200/92

USPC .......................................................... 701/22
See application file for complete search history.

(56) References Cited

U.S. PATENT DOCUMENTS

| | | | | |
|---|---|---|---|---|
| 9,987,946 | B2* | 6/2018 | Park | B60W 20/20 |
| 2009/0118078 | A1* | 5/2009 | Wilmanowicz | B60W 10/08 |
| | | | | 477/3 |
| 2012/0029742 | A1* | 2/2012 | Worthing | F02D 11/105 |
| | | | | 180/65.21 |
| 2012/0072063 | A1* | 3/2012 | Kato | B60W 10/26 |
| | | | | 180/65.265 |
| 2014/0074331 | A1 | 3/2014 | Shin | |
| 2016/0009271 | A1* | 1/2016 | Choi | B60W 30/182 |
| | | | | 180/65.265 |
| 2017/0057485 | A1* | 3/2017 | Choi | B60W 30/1882 |

FOREIGN PATENT DOCUMENTS

| | | |
|---|---|---|
| KR | 101371476 B1 | 3/2014 |
| KR | 101481288 B1 | 1/2015 |
| KR | 101714206 B1 | 3/2017 |

* cited by examiner

APPARATUS AND METHOD OF CONTROLLING A HYBRID VEHICLE

CROSS-REFERENCE TO RELATED APPLICATION

This application claims priority to and the benefit of Korean Patent Application No. 10-2019-0149865 filed in the Korean Intellectual Property Office on Nov. 20, 2019, the entire contents of which are incorporated herein by reference.

BACKGROUND

(a) Field of the Disclosure

The present disclosure relates to an apparatus and a method of controlling a hybrid vehicle, and more particularly, to an apparatus and a method of controlling a hybrid vehicle including an engine provided with an electric supercharger.

(b) Description of the Related Art

A hybrid vehicle is a vehicle using two or more kinds of power sources, and generally refers to a hybrid electric vehicle driven by using an engine and a motor. The hybrid electric vehicle may form various structures by using two or more kinds of power sources including an engine and a motor.

In general, the hybrid electric vehicle adopts a power train in a scheme of a Transmission Mounted Electric Device (TMED) in which a driving motor, a transmission, and a driving shaft are serially connected.

Further, a clutch is provided between the engine and the motor, so that the hybrid electric vehicle is operated in an Electric Vehicle (EV) mode, a Hybrid Electric Vehicle (HEV) mode, or an engine single mode according to the coupling of the clutch. The EV mode is the mode in which the vehicle travels only with driving power of the driving motor, the HEV mode is the mode in which the vehicle travels with driving power of the driving motor and the engine, and the engine single mode is the mode in which the vehicle travels only with driving power of the engine.

In general, an operating point of the hybrid vehicle is determined according to a torque requirement of a driver, but it is very important to constantly maintain a State of Charge (SOC) that means a charging state of a battery according to a travelling situation of the vehicle.

Particularly, in the case where a travelling load of the vehicle is very large (for example, when the vehicle travels on high ground, when the vehicle travels on a long downhill load, when a large load or high load is connected to the vehicle, when an outside temperature is very high or low, so that an output of a battery is limited, and the like), when an engine operating point of the engine is not appropriately adjusted, the vehicle is operated in a high engine revolutions per minute (RPM) region. Thus, engine efficiency and fuel efficiency may be degraded.

Further, in the high load situation, when power of the engine is continuously assisted through the driving motor in order to satisfy a travelling condition, there may occur the case where it fails to prevent the SOC of the battery from being sharply decreased.

The above information disclosed in this Background section is only for enhancement of understanding of the background of the disclosure, and therefore the Background section may contain information that does not form the prior art that is already known in this country to a person of ordinary skill in the art.

SUMMARY

The present disclosure has been made in an effort to provide an apparatus and a method of controlling a hybrid vehicle. The apparatus and method control an engine to be operated at an optimal engine operating point according to a travelling situation of a vehicle to satisfy a torque requirement of a driver and prevent a State of Charge (SOC) of a battery from being sharply decreased.

An apparatus of controlling a hybrid vehicle according to an embodiment of the present disclosure may include an engine configured to generate power by combustion of fuel. The apparatus may further include a driving motor configured to assist power of the engine and selectively operate as a power generator to generate electric energy. The apparatus may further include a hybrid starter and generator (HSG) configured to start the engine and selectively operate as a power generator to generate electric energy. The apparatus may further include a clutch provided between the engine and the driving motor. The apparatus may further include a battery configured to supply electric energy to the driving motor or charge electric energy generated in the driving motor. The apparatus may further include an exhaust gas recirculation (EGR) apparatus configured to resupply a part of exhaust gas discharged from the engine to the engine. The apparatus may further include an electric supercharger installed in an intake line, in which outside air supplied to combustion chambers of the engine flows, respectively. The apparatus may further include a controller configured to variably control: a travelling mode of the hybrid vehicle through the engine and the driving motor; an operating point of the engine; a lock charge through the driving motor and the HSG; and a shifting pattern based on a required torque of a driver and a SOC of the battery.

When the SOC of the battery is in a critical high region, the controller may control the travelling mode to be an Electric Vehicle (EV) mode. Only when the required torque of the driver exceeds a maximum torque of the driving motor, the controller may control the travelling mode to be a Hybrid Electric Vehicle (HEV) mode. When the travelling mode is the HEV mode, the controller may control the operating point of the engine to output an engine torque lower than that in an optimal operating line that means an optimal operating point of the engine by a predetermined range. The controller may further determine the shifting pattern to be a normal shifting pattern. Only when a temperature of a catalyst of a catalyst converter is equal to or higher than a predetermined temperature, the controller may control the shifting pattern to be a catalyst protecting normal shifting pattern.

When the SOC of the battery is in a high region, the controller may control the travelling mode to be an EV mode. Only when the required torque of the driver exceeds a maximum torque of the driving motor, the controller may control the travelling mode to be a HEV mode. When the travelling mode is the HEV mode, the controller controls the operating point of the engine to be an optimal operating line that means an optimal operating point of the engine. The controller may further determine the shifting pattern to be a normal shifting pattern. Only when a temperature of a catalyst of a catalyst converter is equal to or higher than a predetermined temperature, the controller may control the shifting pattern to be a catalyst protecting normal shifting pattern.

When the SOC of the battery is in a normal discharge region, the controller may control the travelling mode such that an EV mode takes priority over an HEV mode. When the travelling mode is the HEV mode, the controller may control the operating point of the engine to be an optimal operating line. The lock charge in a coasting state is performed in the case where the vehicle travels on an uphill road. The controller may determine the shifting pattern to be a normal shifting pattern. Only when a temperature of a catalyst of a catalyst converter is equal to or higher than a predetermined temperature, the controller may control the shifting pattern to be a catalyst protecting normal shifting pattern.

When the SOC of the battery is in a normal charge region, the controller may control the travelling mode such that an HEV mode takes priority over an EV mode. In the case where the travelling mode is the HEV mode, when the required torque of the driver is in a high torque region, the controller controls the operating point of the engine to be an EGR max line. When the required torque of the driver is in a low torque region that is lower than the high torque region, the controller controls the operating point of the engine to be an optimal operating line. The lock charge in a coasting state is performed in the case where the vehicle travels a flat road and on an uphill road. The controller may determine the shifting pattern to be a normal shifting pattern. Only when a temperature of a catalyst of a catalyst converter is equal to or higher than a predetermined temperature, the controller may control the shifting pattern to be a catalyst protecting normal shifting pattern.

When the SOC of the battery is in a low region, the controller may control the travelling mode to be an HEV mode. In the case where the travelling mode is the HEV mode, when the required torque of the driver is in a high torque region, the controller controls the operating point of the engine to be a part-load max line. When the required torque of the driver is in a low torque region that is lower than the high torque region, the controller controls the operating point of the engine to be an optimal operating line. The lock charge in a coasting state is performed in the case where the vehicle travels on a downhill road, a flat road, and on an uphill road. The controller may determine the shifting pattern to be a normal shifting pattern. Only when a temperature of a catalyst of a catalyst converter is equal to or higher than a predetermined temperature, the controller may control the shifting pattern to be a catalyst protecting low shifting pattern.

When the SOC of the battery is in a low region, the controller may control the travelling mode to be an HEV mode. In the case where the travelling mode is the HEV mode, when the required torque of the driver is in a high torque region, the controller controls the operating point of the engine to be a part-load max line. When the required torque of the driver is in a low torque region that is lower than the high torque region, the controller controls the operating point of the engine to be an optimal operating line. When the vehicle travels under a high load condition for a predetermined time or longer, the controller controls the operating point of the engine to be a catalyst protecting temperature line. The lock charge in a coasting state is performed in the case where the vehicle travels a flat road and on an uphill road. The controller may determine the shifting pattern to be a normal shifting pattern. Only when a temperature of a catalyst of a catalyst converter is equal to or higher than a predetermined temperature, the controller may control the shifting pattern to be a catalyst protecting low shifting pattern.

When the SOC of the battery is in a critical low region, the controller may control the travelling mode to be an HEV mode. When the required torque of the driver is in a high torque region, the controller controls the operating point of the engine to be a full-load max line. When the required torque of the driver is in a low torque region that is lower than the high torque region, the controller controls the operating point of the engine to be an optimal operating line. When the vehicle is stopping, the controller operates the engine to perform an idle charge. The controller may control a lock charge in a coasting state to be always performed. The controller determines the shifting pattern to be a normal shifting pattern. Only when a temperature of a catalyst of a catalyst converter is equal to or higher than a predetermined temperature, the controller may control the shifting pattern to be a catalyst protecting low shifting pattern.

A method of controlling a hybrid vehicle according to another embodiment of the present disclosure may include determining a SOC of a battery and a required torque of a driver The method may further include variably controlling: a travelling mode of the hybrid vehicle through an engine and a driving motor of the hybrid vehicle; an operating point of the engine; a lock charge condition through the driving motor and a hybrid starter and generator (HSG); and a shifting pattern based on the required torque of the driver and the determined SOC of the battery.

When the SOC of the battery is in a critical high region, the travelling mode may be controlled to be an EV mode. Only when the required torque of the driver exceeds a maximum torque of the driving motor, the travelling mode may be controlled to be a HEV mode. When the travelling mode is the HEV mode, the operating point of the engine is controlled to output an engine torque lower than an optimal operating line that means an optimal operating point of the engine by a predetermined range. The shifting pattern may be determined to be a normal shifting pattern. Only when a temperature of a catalyst of a catalyst converter is equal to or higher than a predetermined temperature, the shifting pattern may be controlled to be a catalyst protecting normal shifting pattern.

When the SOC of the battery is in a high region, the travelling mode may be controlled to be an EV mode. Only when the required torque of the driver exceeds a maximum torque of the driving motor, the travelling mode is controlled to be an HEV mode. When the travelling mode is the HEV mode, the operating point of the engine may be controlled to be an optimal operating line that means an optimal operating point of the engine. The shifting pattern may be determined to be a normal shifting pattern. Only when a temperature of a catalyst of a catalyst converter is equal to or higher than a predetermined temperature, the shifting pattern may be controlled to be a catalyst protecting normal shifting pattern.

When the SOC of the battery is in a normal discharge region, the travelling mode may be controlled such that an EV mode takes priority over an HEV mode. When the travelling mode is the HEV mode, the operating point of the engine is controlled to be an optimal operating line. The lock charge in a coasting state may be performed in the case where the vehicle travels on an uphill road. The shifting pattern may be determined to be a normal shifting pattern. Only when a temperature of a catalyst of a catalyst converter is equal to or higher than a predetermined temperature, the shifting pattern may be controlled to be a catalyst protecting normal shifting pattern.

When the SOC of the battery is in a normal charge region, the travelling mode may be controlled such that an HEV mode takes priority over an EV mode. In the case where the travelling mode is the HEV mode, when the required torque of the driver is in a high torque region, the operating point of the engine is controlled to be an EGR max line. When the required torque of the driver is in a low torque region that is lower than the high torque region, the operating point of the engine may be controlled to be an optimal operating line. The lock charge in a coasting state may be performed in the case where the vehicle travels a flat road and on an uphill road. The shifting pattern may be determined to be a normal shifting pattern. Only when a temperature of a catalyst of a catalyst converter is equal to or higher than a predetermined temperature, the shifting pattern may be controlled to be a catalyst protecting normal shifting pattern.

When the SOC of the battery is in a low region, the travelling mode may be controlled to be an HEV mode. In the case where the travelling mode is the HEV mode, when the required torque of the driver is in a high torque region, the operating point of the engine may be controlled to be a part-load max line. When the required torque of the driver is in a low torque region that is lower than the high torque region, the operating point of the engine may be controlled to be an optimal operating line. The lock charge in a coasting state may be performed in the case where the vehicle travels on a downhill road, a flat road, and on an uphill road. The shifting pattern may be determined to be a normal shifting pattern. Only when a temperature of a catalyst of a catalyst converter is equal to or higher than a predetermined temperature, the shifting pattern may be controlled to be a catalyst protecting low shifting pattern.

When the SOC of the battery is in a low region, the travelling mode may be controlled to be an HEV mode. In the case where the travelling mode is the HEV mode, when the required torque of the driver is in a high torque region, the operating point of the engine may be controlled to be a part-load max line. When the required torque of the driver is in a low torque region that is lower than the high torque region, the operating point of the engine may be controlled to be an optimal operating line. When the vehicle travels under a high load condition for a predetermined time or longer, the operating point of the engine may be controlled to be a catalyst protecting temperature line. The lock charge in a coasting state may be performed in the case where the vehicle travels a flat road and on an uphill road. The shifting pattern may be determined to be a normal shifting pattern. Only when a temperature of a catalyst of a catalyst converter is equal to or higher than a predetermined temperature, the shifting pattern may be controlled to be a catalyst protecting low shifting pattern.

When the SOC of the battery is in a critical low region, the travelling mode may be controlled to be an HEV mode. When the required torque of the driver is in a high torque region, the operating point of the engine may be controlled to be a full-load max line. When the required torque of the driver is in a low torque region that is lower than the high torque region, the operating point of the engine may be controlled to be an optimal operating line. When the vehicle is stopping, an idle charge may be performed by operating the engine. The lock charge in a coasting state may be controlled to be always performed. The shifting pattern may be determined to be a normal shifting pattern. Only when a temperature of a catalyst of a catalyst converter is equal to or higher than a predetermined temperature, the shifting pattern may be controlled to be a catalyst protecting low shifting pattern.

According to the apparatus and the method of controlling a hybrid vehicle according to embodiments of the present disclosure, an operating point of an engine is variably controlled based on an SOC of a battery and a torque requirement of a driver. Such an apparatus and a method may satisfy the torque requirement of the driver and prevent the SOC of the battery from being sharply decreased.

Further, it is possible to maintain an engine speed in a low RPM region under a high load condition. Such an apparatus and a method may improve fuel efficiency of a vehicle.

Further, it is possible to fundamentally prevent an SOC of the battery from entering a low region. Such an apparatus and a method may prevent an operating point of an engine from entering a part-load max line and thus reduce emission.

Further, the engine is controlled not to be operated when an operating point of the engine is equal to or larger than a catalyst protecting line. Such an apparatus and a method may prevent a catalyst from deteriorating.

Further, an output of the engine is improved by using the electric supercharger in the situation where the battery is being charged, and power of the battery is supplied to the electric supercharger in the situation where the battery is being discharged. Such an apparatus and a method may improve charge/discharge efficiency of the battery.

BRIEF DESCRIPTION OF THE DRAWINGS

Since the drawings are for reference to describe the embodiments of the present disclosure, the technical spirit of the present disclosure should not be interpreted as being limited to the accompanying drawings.

DETAILED DESCRIPTION OF THE EMBODIMENTS

Figure 1:
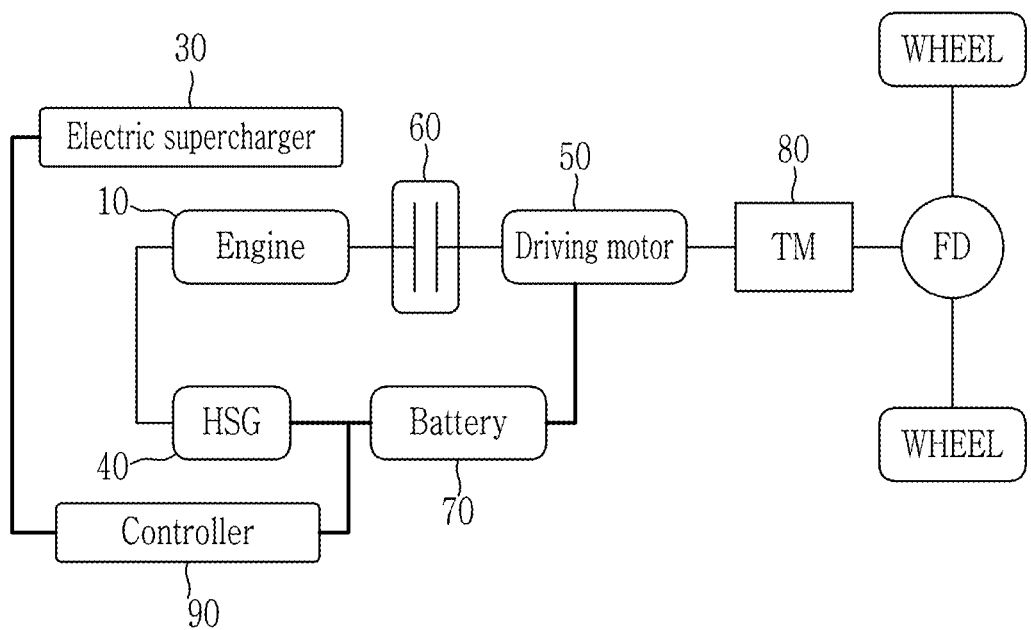
FIG. 1 is a conceptual diagram illustrating a configuration of an apparatus for controlling a hybrid vehicle according to an embodiment of the present disclosure.

The present disclosure is described more fully hereinafter with reference to the accompanying drawings, in which embodiments of the disclosure are shown. As those having ordinary skill in the art should realize, the described embodiments may be modified in various different ways, all without departing from the spirit or scope of the present disclosure.

The drawings and description are to be regarded as illustrative in nature and not restrictive, and like reference numerals designate like elements throughout the specification.

In addition, the size and thickness of each configuration shown in the drawings are arbitrarily shown for understanding and ease of description, but the present disclosure is not limited thereto, and for clearly illustrate several portions and regions, thicknesses thereof are increased.

Hereinafter, an apparatus for controlling a hybrid vehicle according to an embodiment of the present disclosure is described in detail with reference to the accompanying drawings.

Figure 2:
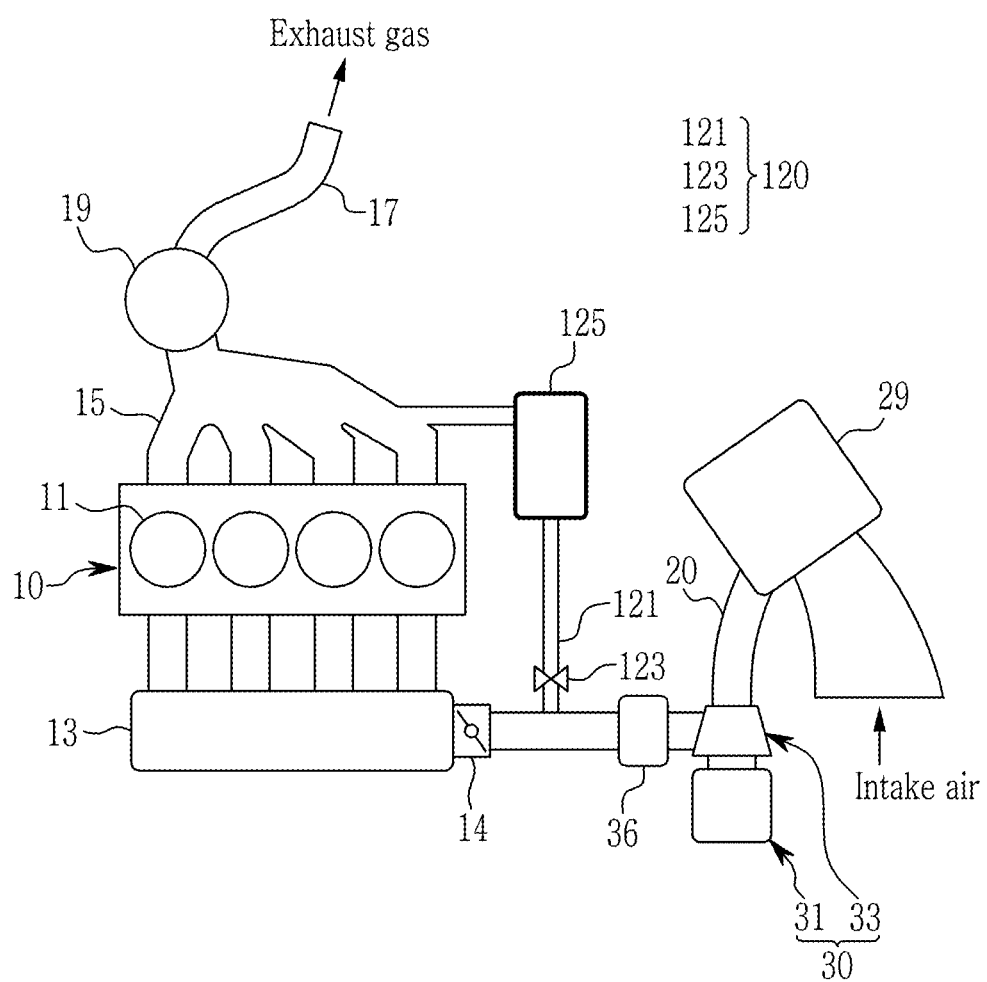
FIG. 2 is a conceptual diagram illustrating a relationship between an engine and an electric supercharger of the hybrid vehicle according to an embodiment of the present disclosure.

FIG. 1 is a conceptual diagram illustrating a configuration of an apparatus for controlling a hybrid vehicle according to an embodiment of the present disclosure. FIG. 2 is a conceptual diagram illustrating a relationship between an engine and an electric supercharger of the hybrid vehicle according to an embodiment of the present disclosure. Further, FIG. 3 is a block diagram illustrating the configuration of the apparatus for controlling the hybrid vehicle according to an embodiment of the present disclosure.

The hybrid vehicle according to the specific embodiment of the present disclosure described below is described based on a structure of a Transmission Mounted Electric Device (TMED) scheme as an example. However, the scope of the present disclosure is not limited thereto, and the present disclosure may be applied to hybrid electric vehicles in other schemes as a matter of course.

Figure 3:
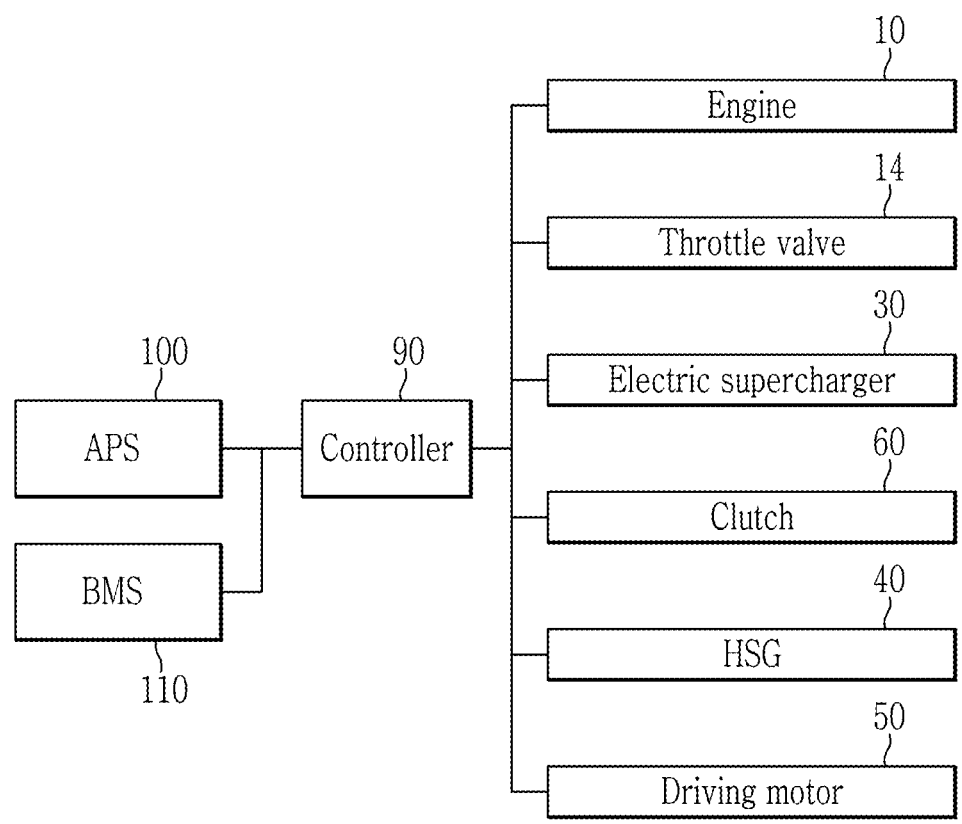
FIG. 3 is a block diagram illustrating the configuration of the apparatus for controlling the hybrid vehicle according to an embodiment of the present disclosure.

As illustrated in FIGS. 1-3, a hybrid vehicle to which the apparatus for controlling the hybrid vehicle according to an embodiment of the present disclosure is applied may include an engine 10, a hybrid starter and generator (HSG) 40, a driving motor 50, a clutch 60, a battery 70, an electric supercharger 30, an intercooler 36, an acceleration pedal sensor, and a controller 90.

First, a structure of the engine 10 system to which the apparatus for controlling the hybrid vehicle according to an embodiment of the present disclosure is applied is described in detail with reference to the accompanying drawings.

The engine 10 system according to an embodiment of the present disclosure includes the engine 10 including a plurality of combustion chambers 11 and which generates driving power by combustion of fuel, an intake line 20, or a plurality of intake lines, in which outside air supplied to the combustion chambers 11 flows, an intercooler 36, and an electric supercharger 30 installed in the intake line 20.

The intake air supplied to the combustion chamber 11 of the engine 10 is supplied through the plurality of intake lines 20, and exhaust gas discharged from the combustion chamber 11 of the engine 10 is discharged to the outside through an exhaust manifold 15 and an exhaust line 17. In this embodiment, a catalyst converter 19 including a catalyst which purifies exhaust gas is installed in the exhaust line 17.

The electric supercharger 30 installed in an intake line 20 is for the purpose of supplying supercharged air to the combustion chamber 11 and includes a motor 31 and an electric compressor 33. The electric compressor 33 is operated by the motor 31 and compresses outside air according to an operation condition and supplies the compressed outside air to the combustion chamber 11.

The intercooler 36 cools the outside air compressed by the electric supercharger 30, the compressed air having a high temperature. This increases the air density and thereby improves combustion efficiency.

An air cleaner 29 for filtering outside air introduced from the outside is mounted in an entrance of the intake line 20.

Intake air introduced through the intake line 20 is supplied to the combustion chamber 11 through an intake manifold 13. A throttle valve 14 is mounted to the intake manifold 13, so that the amount of air supplied to the combustion chamber 11 may be adjusted.

The HSG 40 starts the engine 10 and selectively operates as a power generator in the state where the engine 10 starts to generate electric energy.

The driving motor 50 assists power of the engine 10 and selectively operates as a power generator to generate electric energy.

The driving motor 50 is operated by using electric energy charged in the battery 70, and the electric energy generated in the driving motor 50 and the HSG 40 is charged in the battery 70.

The apparatus for controlling the hybrid vehicle according to an embodiment of the present disclosure varies in terms of an operating point, a travelling mode, and a gear shifting pattern of the engine 10 based on a State of Charge (SOC) of the battery 70 and a torque requirement of a driver.

Figure 4:
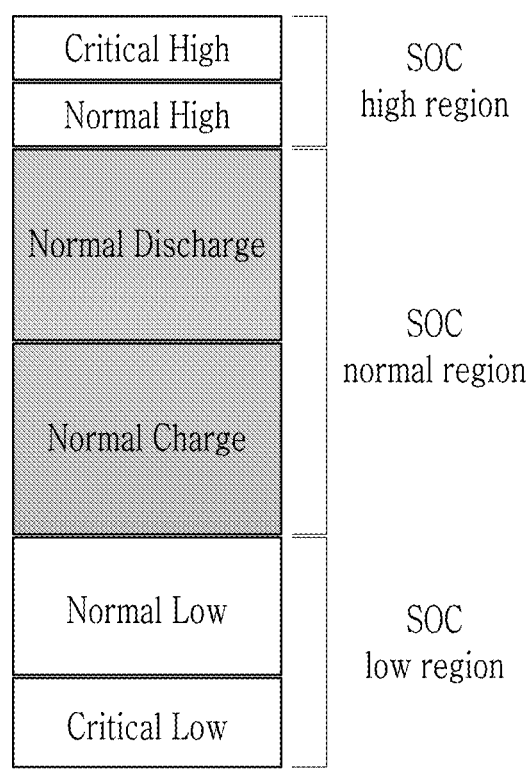
FIG. 4 is a diagram illustrating a State of Charge (SOC) region of a battery according to an embodiment of the present disclosure.

The SOC of the battery 70 may generally be divided into three regions. Referring to FIG. 4, the SOC region of the battery 70 may be divided into a high region, a normal region, and a low region according to the charging amount of the battery 70.

Further, according to the charging amount of the battery 70, the high region may be divided into a Critical High (CH) region and a Normal High (NH) region, the normal region may be divided into a normal discharge (ND) region and a normal charge (NC) region, and the low region may be divided into a normal low (NL) region and a critical low (CL) region.

The acceleration pedal sensor (APS) 100 detects an operation of an acceleration pedal. The accelerator pedal position detected by the accelerator pedal sensor is transmitted to the controller 90. The controller 90 may determine a torque requirement according to an acceleration intention of the driver from the accelerator pedal position detected by the accelerator pedal sensor, and selectively switch the travelling mode of the vehicle to the Electric Vehicle (EV) mode, the Hybrid Electric Vehicle (HEV) mode, and the engine 10 single mode.

The gear shifting pattern may be divided into a normal shifting pattern or SOC normal shifting pattern and a catalyst protection shifting pattern.

The SOC normal shifting pattern may be determined according to a current speed of the vehicle and the torque requirement of the driver (for example, the acceleration pedal position), and may be pre-stored in the controller in the form of map data.

The catalyst protection shifting pattern is for the purpose of preventing an excessive increase in a temperature of a catalyst and may be divided into a catalyst protection normal shifting pattern and a catalyst protection low shifting pattern according to the SOC of the battery. The catalyst protection normal shifting pattern means the shifting pattern when a catalyst temperature is equal to or higher than a set temperature and the SOC of the battery is in the normal region or more, and the catalyst protection low shifting pattern means the shifting pattern when a catalyst temperature is equal to or higher than a set temperature and the SOC of the battery is in the low region.

The catalyst protection shifting pattern may be determined according to a current speed of the vehicle, the torque requirement of the driver (for example, the acceleration pedal change amount), the SOC of the battery, and a catalyst temperature of the catalyst converter, and the catalyst protection shifting pattern may be pre-stored in the controller in the form of map data.

The catalyst protection normal shifting pattern may mean to increase driving power by reducing a shift stage by one stage compared to the SOC normal shifting pattern, and the catalyst protection low shifting pattern may mean to increase driving power by reducing a shift stage by two or more stages compared to the catalyst protection normal shifting pattern.

In other words, when a catalyst temperature of the catalyst converter is very high (for example, 500° C.), a problem that the catalyst deteriorates may occur. In order to decrease the temperature of the catalyst, it is necessary to decrease a torque of the engine. When the torque of the engine is decreased, driving power of the vehicle meets by increasing an engine speed, and to this end, the engine speed is increased by using the shifting pattern.

When the SOC of the battery is in the low region, it is more important to recover the SOC of the battery than to cope with the traveling load, so that the torque of the engine is further decreased through the catalyst protection low shifting pattern.

The controller 90 controls the constituent elements of the vehicle including the engine 10, the HSG 40, the driving motor 50, the electric supercharger 30, the battery 70, and the clutch 60.

To this end, the controller 90 may be provided as one or more processors operated by a set program, and the set program may perform each operation of a method of controlling a hybrid vehicle according to an embodiment of the present disclosure.

The clutch 60 is provided between the engine 10 and the driving motor 50, and the hybrid vehicle is operated in the engine 10 mode, the EV mode, or the HEV mode according to the coupling of the clutch 60. The EV mode is the mode in which the vehicle travels only with driving power of the motor, the HEV mode is the mode in which the vehicle travels with driving power of the motor and the engine 10, and the engine 10 mode is the mode in which the vehicle travels only with driving power of the engine 10.

Driving power output from the engine 10 and the driving motor 50 is transferred to the driving wheels provided in the vehicle. In this embodiment, a transmission 80 is provided between the clutch 60 and the driving wheels. A shifting gear is installed inside the transmission 80, so that torque output from the engine 10 and the driving motor 50 may be changed according to a shifting gear stage.

The hybrid vehicle according to an embodiment of the present disclosure may further include an exhaust gas recirculation apparatus (EGR) 120. The EGR 120 is the apparatus which resupplies a part of the exhaust gas discharged from the combustion chamber 11 of the engine 10 to the combustion chamber 11 of the engine 10, and may include an EGR line 121 which is branched from the exhaust line 17 and is joined to the intake line 20, an EGR valve 123 which is installed in a recirculation line and adjusts the amount of recirculated exhaust gas, and an EGR cooler 125, which is installed in the recirculation line and cools recirculated exhaust gas.

The exhaust gas discharged from the engine 10 is discharged to the catalyst converter 19. The catalyst converter 19 may include a Lean NOx trap (LNT) for purifying a nitrogen oxide, a diesel oxidation catalyst, and a diesel particulate filter. Otherwise, the catalyst converter 19 and 55 may include a three-way catalyst for purifying a nitrogen oxide. A temperature of the catalyst provided in the catalyst converter 19 may be detected through a temperature sensor and transmitted to the controller 90.

Hereinafter, a method of controlling a hybrid vehicle according to an embodiment of the present disclosure is described in detail with reference to the accompanying drawings.

Figure 5:
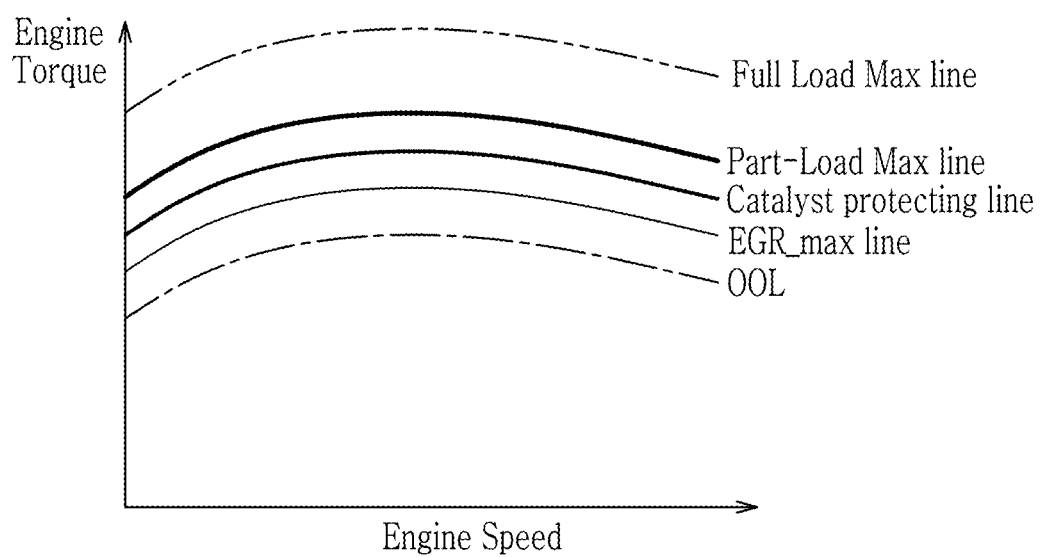
FIG. 5 is a diagram illustrating an operating point of the engine according to an embodiment of the present disclosure.

Further referring to FIG. 5, the engine 10 of the hybrid vehicle according to an embodiment of the present disclosure may be controlled with an operating point of any one among an optimal operating line (OOL), an EGR max line, a catalyst protecting line, a part-load max line, and a full-load max line based on an SOC of the battery 70 and a torque requirement of a driver.

The optimal operating line may mean an optimal operating point of the engine 10 and mean an operating point at which fuel consumption is minimized.

The EGR max line may mean a maximum engine 10 torque outputtable by the engine 10 when exhaust gas is recirculated to the combustion chamber 11 of the engine 10 by operating the exhaust gas recirculation apparatus.

When the vehicle travels under a high-load condition for a long time (for example, 30 minutes or longer), a temperature of exhaust gas increases and a temperature of the catalyst within the catalyst converter 19 increases. When the temperature of the catalyst is excessively high, there is a problem that the catalyst deteriorates. Thus, the catalyst protecting line may mean the torque of the engine 10 for preventing the temperature of the catalyst from excessively increasing (for example, 500° C.). The catalyst protecting line is mainly used in the SOC low region and may also be used in the SOC normal region or high region.

The part-load max line may mean a maximum torque line outputtable by the engine 10 when lambda of the engine 10 is smaller than "1".

The full-load max line may mean a maximum torque outputtable by the engine 10.

The hybrid vehicle according to an embodiment of the present disclosure may supply supercharged air to the combustion chamber 11 of the engine 10 through the electric supercharger 30, thereby outputting a higher torque of the engine 10 compared to an existing natural aspiration engine 10.

Figure 6:
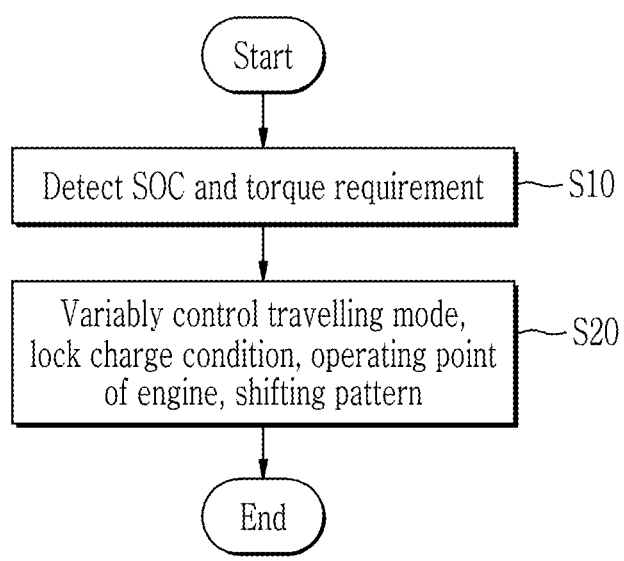
FIG. 6 is a flowchart illustrating a method of controlling a hybrid vehicle according to an embodiment of the present disclosure.

Further referring to FIG. 6, first, the controller 90 detects an SOC of the battery 70 and a required torque of a driver at step S10. The SOC of the battery 70 may be received from a battery management system (BMS) 110, and the required torque of the driver may be determined from the position of the APS 100.

The controller 90 adjusts a travelling mode, an operating point of the engine 10, a lock charge condition, and a shifting pattern of the vehicle based on the SOC of the battery 70 and the required torque of the driver (S20). Hereinafter, a method of controlling the travelling mode, the operating point, the lock charge condition, and the shifting pattern based on the SOC and the required torque of the driver is described in detail.

When the SOC region of the battery 70 is the CH region, the controller 90 controls the vehicle to travel in the EV mode. In this embodiment, the operation of the engine 10 is stopped and the clutch 60 is released, so that the vehicle may travel only with driving power of the driving motor 50.

However, only when the required torque of the driver exceeds a maximum torque of the driving motor 50, the engine 10 operates and the vehicle may travel in the HEV mode. When the SOC is in the CH region and the travelling mode is the HEV mode, the operating point of the engine 10 is controlled such that the engine 10 torque lower than that of the optimal operating line by a predetermined range is output.

Further, the lock charge is not performed in a coasting situation.

Figure 7:
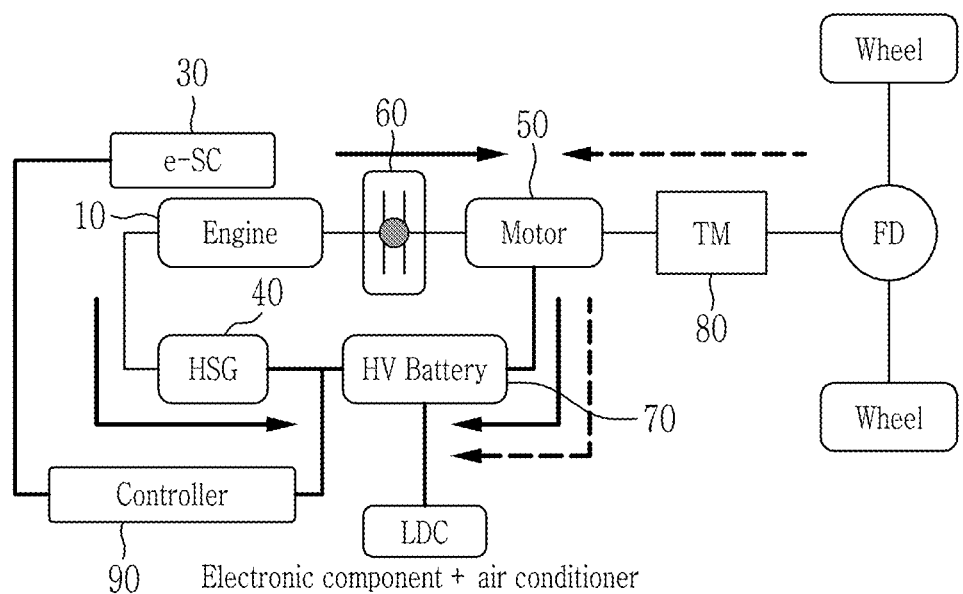
FIG. 7 is a diagram illustrating lock charge according to an embodiment of the present disclosure.

Referring to FIG. 7, the lock charge means to operate the engine 10 without releasing the clutch 60 (in other words, in the coupling state of the clutch 60) in preparation for the case where the driver reaccelerates in the coasting situation. In the coasting situation, the driver does not step both the acceleration pedal or a deceleration pedal. The lock charge further means to charge the battery 70 through the driving motor 50 and the HSG 40, which operate as the power generators, with coasting travelling energy (see a solid-line arrow of FIG. 7) and energy generated in the engine 10 (see a dotted-line arrow of FIG. 7).

The lock charge is advantageous in a re-acceleration situation immediately after the coasting. When the vehicle travels in the EV mode in the state where the coupling of the clutch 60 is released and then the clutch 60 is coupled by the reacceleration, fuel efficiency loss may be generated by the coupling of the clutch 60. Accordingly, since the lock charge may prevent the unnecessary coupling of the clutch 60, the lock charge is mainly used in the low SOC situation or the case where the vehicle travels on an uphill road on which the vehicle reaccelerates a lot.

During the lock charge, the battery 70 may be rapidly charged by increasing the engine 10 torque by using the electric superchargers 30 installed in the two intake lines 20. The lock charge may charge the battery 70 by using both the driving motor 50 and the HSG 40 and may charge the battery 70 by using only the driving motor 50 without operating the HSG 40.

The controller 90 performs the lock charge so that system power consumption is minimized in consideration all of power consumption of the HSG 40, power consumption of the driving motor 50, and power consumption of the electric supercharger 30.

Further, when the SOC of the battery 70 is in the CH region, the controller 90 controls the shifting pattern to be changed to the normal shifting pattern, and controls the shifting pattern to be changed to the catalyst protecting normal shifting pattern only when a temperature of the catalyst of the catalyst converter 19 is equal to or higher than a predetermined temperature.

In other words, when the SOC of the battery 70 is in the CH region, the controller 90 operates the driving motor 50 and the electronic components through power output from the battery 70 in the EV mode. The controller 90 also maintains the SOC of the battery 70 at an appropriate level by operating the electric supercharger 30 in the HEV mode.

When the SOC of the battery 70 is in a normal high region, the controller 90 controls the vehicle to travel in the EV mode. In this embodiment, the operation of the engine 10 is stopped and the clutch 60 is released, so that the vehicle may travel only with driving power of the driving motor 50.

However, only when the required torque of the driver exceeds a maximum torque of the driving motor 50, the engine 10 operates and the vehicle may travel in the HEV mode. In the HEV mode, the operating point of the engine 10 is controlled to be the OOL.

Figure 8:
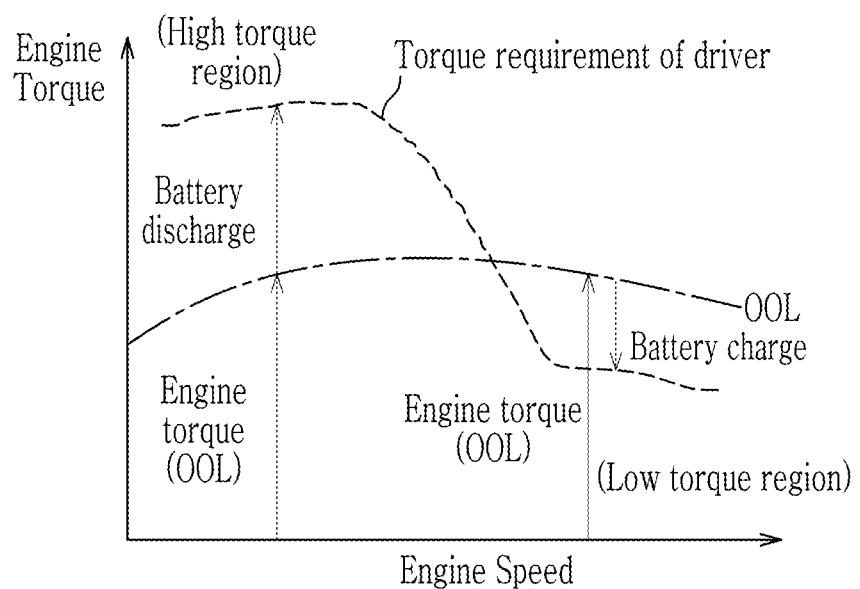
FIG. 8 is a graph illustrating an operating point of the engine in a normal high region and a normal discharge region of the SOC.

As illustrated in FIG. 8, when the required torque of the driver in the high torque region exceeds the optimal operating point, a difference between the required torque of the driver and the torque at the optimal operating point may be supplemented through the torque of the driving motor 50 generated through the discharge of the battery 70. In the meantime, when the required torque of the driver in the low torque region is smaller than the torque at the optimal operating point, a difference between an output torque at the optimal operating point and the required torque of the driver may be generated as power through the driving motor 50 or the HSG 40 and charged in the battery 70.

Further, the lock charging is not performed in a coasting situation.

Further, the controller 90 controls the shifting pattern to be changed to the normal shifting pattern and controls the shifting pattern to be changed to the catalyst protecting normal shifting pattern only when a temperature of the catalyst of the catalyst converter 19 is equal to or higher than a predetermined temperature.

In other words, when the SOC of the battery 70 is in the NH region, the controller 90 operates the driving motor 50 and the electronic components through power output from the battery 70 in the EV mode. The controller 90 also maintains the SOC of the battery 70 at an appropriate level by operating the two electric superchargers 30 in the HEV mode.

When the SOC of the battery 70 is in a normal charge region, the controller 90 controls the traveling mode of the vehicle such that the EV mode takes priority over the HEV mode. For example, the travelling mode may be determined so that a ratio of the EV mode to the HEV mode is about 6:4. A transition of the EV mode and the HEV mode may be determined by the required torque of the driver.

In the HEV mode, the operating point of the engine 10 is controlled to be the OOL.

As illustrated in FIG. 8, when the required torque of the driver in the high torque region exceeds the optimal operating point, a difference between the required torque of the driver and the torque at the optimal operating point may be supplemented through the torque of the driving motor 50 generated through the discharge of the battery 70. In the meantime, when the required torque of the driver in the low torque region is smaller than the torque at the optimal operating point, a difference between an output torque at the optimal operating point and the required torque of the driver may be generated as power through the driving motor 50 or the HSG 40 and charged in the battery 70.

Further, the lock charge in the coasting situation is performed only when the vehicle travels on an uphill road.

Further, the controller 90 controls the shifting pattern to be changed to the normal shifting pattern and controls the shifting pattern to be changed to the catalyst protecting normal shifting pattern only when a temperature of the catalyst of the catalyst converter 19 is equal to or higher than a predetermined temperature.

When the SOC of the battery 70 is in the normal charge region, the controller 90 operates the driving motor 50 and the electronic components through power output from the battery 70 in the EV mode. The controller 90 also maintains the SOC of the battery 70 at an appropriate level by operating the electric supercharger 30 in the HEV mode.

When the SOC of the battery 70 is in the normal charge region, the controller 90 controls the traveling mode of the vehicle such that the HEV mode takes priority over the EV mode. For example, the travelling mode may be determined so that a ratio of the HEV mode to the EV mode is about 6:4. A transition of the EV mode and the HEV mode may be determined by the required torque of the driver.

When the required torque of the driver is in the high torque region in the HEV mode, the operating point of the engine 10 is controlled to be the EGR max line, and when the required torque of the driver is in the low torque region that is lower than the high torque region, the operating point of the engine 10 is controlled to be the OOL.

Figure 9:
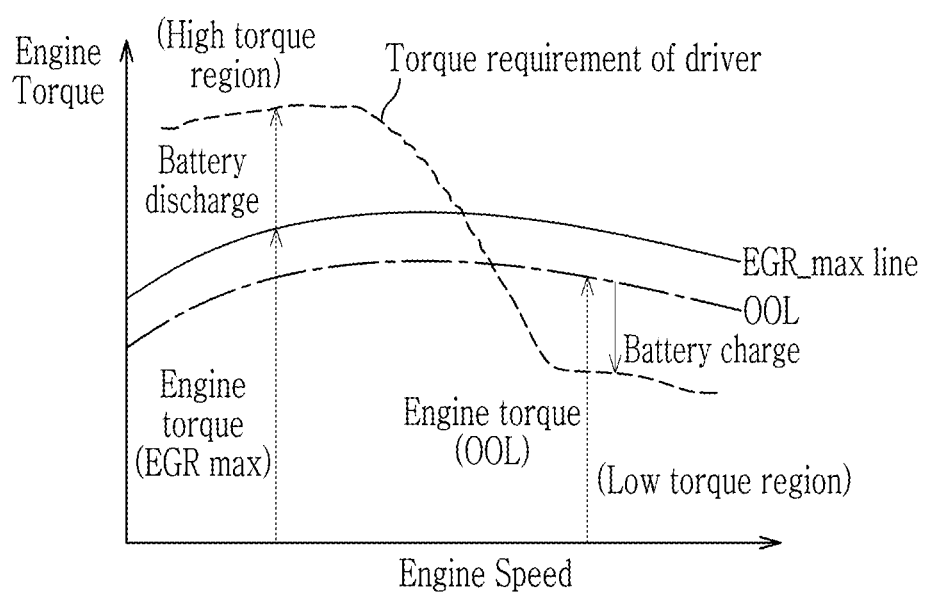
FIG. 9 is a graph illustrating an operating point of the engine in a normal charge region of the SOC.

As illustrated in FIG. 9, when the required torque of the driver in the high torque region exceeds the torque in the EGR max line, a torque difference between the required torque of the driver and the torque in the EGR max line may be supplemented through the torque of the driving motor 50 generated through the discharge of the battery 70. In the meantime, when the required torque of the driver in the low torque region is smaller than the torque at the optimal operating point, a difference between an output torque at the optimal operating point and the required torque of the driver may be generated as power through the driving motor 50 or the HSG 40 and charged in the battery 70.

Further, the lock charge in the coasting situation is performed only when the vehicle travels on a flat road and on an uphill road.

Further, the controller 90 controls the shifting pattern to be changed to the normal shifting pattern and controls the shifting pattern to be changed to the catalyst protecting normal shifting pattern only when a temperature of the catalyst of the catalyst converter 19 is equal to or higher than a predetermined temperature.

When the SOC of the battery 70 is in the normal charge region, partial power output from the engine 10 is temporarily stored in the battery 70 through the driving motor 50 in the HEV mode. The electric superchargers 30 and the electronic component may be operated with the power temporarily stored in the battery 70.

When the SOC of the battery 70 is in a low region, the controller 90 controls the vehicle to travel in the HEV mode.

When the required torque of the driver is in the high torque region in the HEV mode, the operating point of the engine 10 is controlled to be the part-load max line. When the required torque of the driver is in the low torque region that is lower than the high torque region, the operating point of the engine 10 is controlled to be the OOL.

Figure 10:
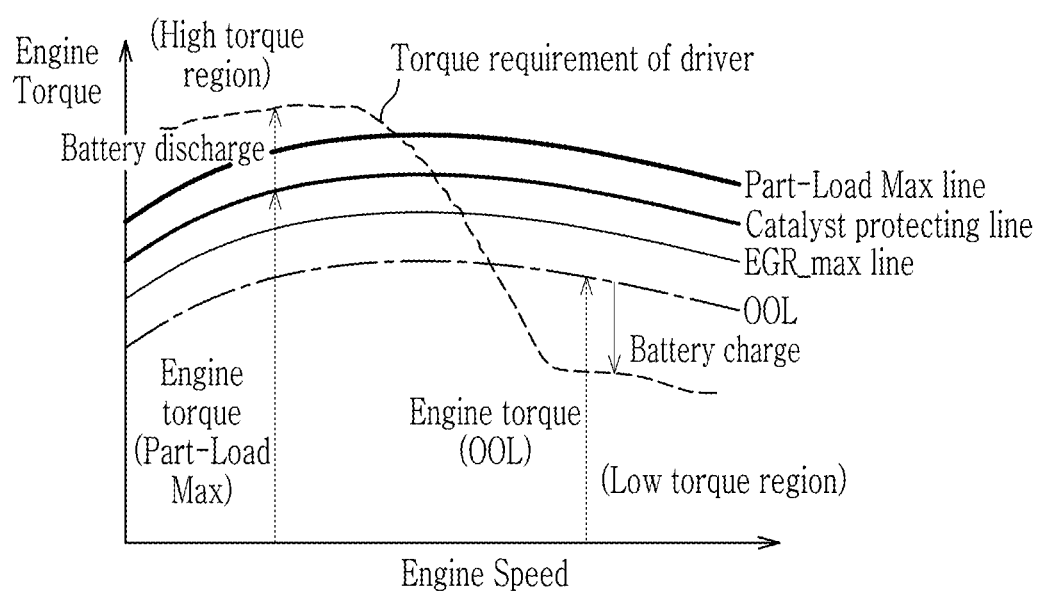
FIG. 10 is a graph illustrating an operating point of the engine in a low region of the SOC.

As illustrated in FIG. 10, when the required torque of the driver in the high torque region exceeds the torque in the part-load line, a torque difference (see a left dotted-line arrow of FIG. 10) between the required torque of the driver and the torque in the part-load max line may be supplemented through the torque of the driving motor 50 generated through the discharge of the battery 70. In the meantime, when the required torque of the driver in the low torque region is smaller than the torque at the optimal operating point, a difference between an output torque at the optimal operating point and the required torque of the driver may be generated as power through the driving motor 50 or the HSG 40 and charged in the battery 70.

However, when the vehicle travels under a high load condition for a predetermined time (for example, 30 minutes or longer), the operating point of the engine 10 may be controlled to the catalyst protecting line. When the vehicle is operated under a high load condition for a long time, a temperature of the catalyst may excessively increase. Thus, the deterioration of the catalyst may be prevented by making the engine 10 be operated in the catalyst protecting line.

Accordingly, as illustrated in FIG. 10, when the required torque of the driver in the high torque region exceeds the torque in the catalyst protecting line, a difference (see a left solid-line arrow of FIG. 10) between the required torque of the driver and the torque in the catalyst protecting line may be supplemented through the torque of the driving motor 50 generated through the discharge of the battery 70. In the meantime, when the required torque of the driver in the low torque region is smaller than the torque at the optimal operating point, a difference between an output torque at the optimal operating point and the required torque of the driver may be generated as power through the driving motor 50 or the HSG 40 and charged in the battery 70.

Further, the lock charge in the coasting situation is performed only when the vehicle travels on a flat road and an uphill road.

Further, the controller 90 controls the shifting pattern to be changed to the normal shifting pattern and controls the shifting pattern to be changed to the catalyst protecting low shifting pattern only when a temperature of the catalyst of the catalyst converter 19 is equal to or higher than a predetermined temperature.

When the SOC of the battery 70 is in the low region, partial power output from the engine 10 in the HEV mode is temporarily stored in the battery 70 through the driving motor 50 in the HEV mode, and the electric superchargers 30 and the electronic component may be operated with the power temporarily stored in the battery 70.

Otherwise, when the SOC of the battery 70 is in the critical low region, the controller 90 may also control the vehicle to travel in the HEV mode.

When the required torque of the driver is in the high torque region in the HEV mode, the operating point of the engine 10 is controlled to be the full-load max line. When the required torque of the driver is in the low torque region that is lower than the high torque region, the operating point of the engine 10 is controlled to be the OOL.

Figure 11:
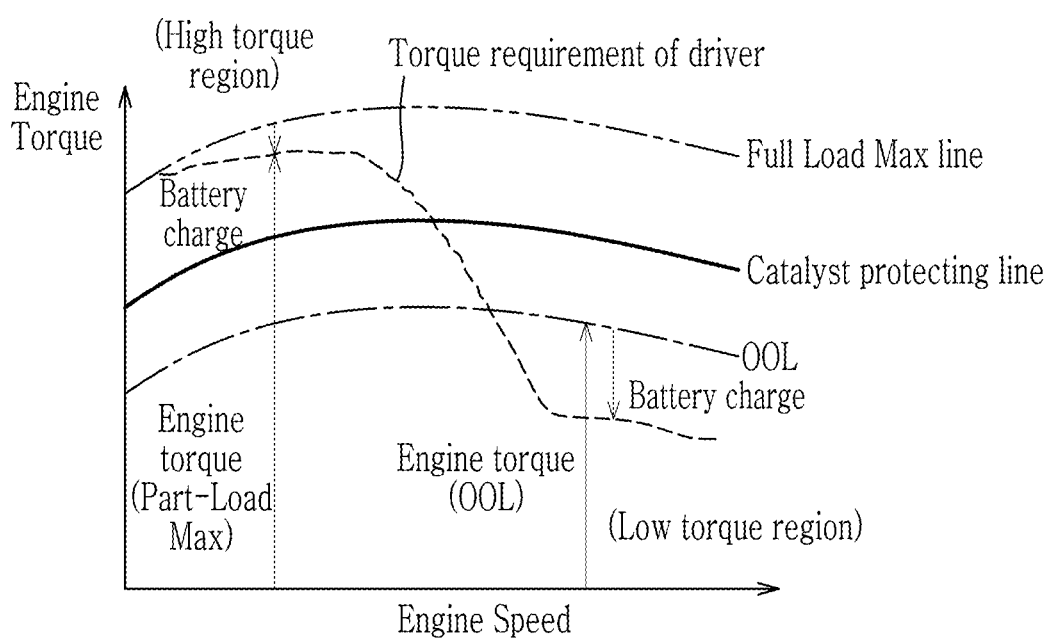
FIG. 11 is a graph illustrating an operating point of the engine in a critical low region of the SOC.

As illustrated in FIG. 11, when the required torque of the driver is in the high torque region is smaller than the full-load max line, a difference between the required torque of the driver and the torque in the full-load max line is generated as power through the driving motor 50 or the HSG 40 and charged in the battery 70. Further, when the required torque of the driver in the low torque region is smaller than the torque at the optimal operating point, a difference between an output torque at the optimal operating point and the required torque of the driver may be generated as power through the driving motor 50 or the HSG 40 and charged in the battery 70.

The lock charge in the coasting situation is always performed.

Further, the controller 90 controls the shifting pattern to be changed to the normal shifting pattern and controls the shifting pattern to be changed to the catalyst protecting low shifting pattern only when a temperature of the catalyst of the catalyst converter 19 is equal to or higher than a predetermined temperature.

While this disclosure has been described in connection with what is presently considered to be practical embodiments, it should be understood that the disclosure is not limited to the disclosed embodiments. On the contrary, it is intended to cover various modifications and equivalent arrangements included within the spirit and scope of the appended claims.

DESCRIPTION OF SYMBOLS

10: engine
11: combustion chamber
13: intake manifold
14: throttle valve
15: exhaust manifold 17: exhaust line
19: catalyst converter
20: intake line
29: air cleaner
30: electric supercharger
31: motor
33: electric compressor
36: intercooler
40: HSG
50: driving motor
60: clutch
70: battery
80: transmission
90: controller
100: APS
110: BMS
120: exhaust gas recirculation (EGR) apparatus
121: EGR line
123: EGR valve
125: EGR cooler

What is claimed is:

1. An apparatus for controlling a hybrid vehicle, the apparatus comprising:
    an engine configured to generate power by combustion of fuel;
    a driving motor configured to assist power of the engine and selectively operate as a power generator to generate electric energy;
    a hybrid starter and generator (HSG) configured to start the engine and selectively operate as a power generator to generate electric energy;
    a clutch provided between the engine and the driving motor;
    a battery configured to supply electric energy to the driving motor or charge electric energy generated in the driving motor;
    an exhaust gas recirculation (EGR) apparatus configured to resupply a part of exhaust gas discharged from the engine to the engine;
    an electric supercharger installed in an intake line, in which outside air supplied to combustion chambers of the engine flows, respectively; and
    a controller configured to variably control a travelling mode of the hybrid vehicle through the engine and the driving motor, an operating point of the engine, a lock charge through the driving motor and the HSG, and a shifting pattern based on a required torque of a driver and a State of Charge (SOC) of the battery,
    wherein the engine is controlled with an operating point of any one among an optimal operating line (OOL), an EGR max line, a catalyst protecting line, a part-load max line, or a full-load max line based on an SOC of the battery and a torque requirement of a driver, and
    wherein the shifting pattern is divided into a normal shifting pattern determined according to a current speed of the vehicle and the torque requirement of the driver and into a catalyst protection shifting pattern including a catalyst protection normal shifting pattern and a catalyst protection low shifting pattern according to the SOC of the battery.

2. The apparatus of claim 1, wherein when the SOC of the battery is in a critical high region,
    the controller controls the travelling mode to be an Electric Vehicle (EV) mode, and only when the required torque of the driver exceeds a maximum torque of the driving motor, the controller controls the travelling mode to be a Hybrid Electric Vehicle (HEV) mode,
    when the travelling mode is the HEV mode, the controller controls the operating point of the engine to output an engine torque lower than that in the optimal operating line that means an optimal operating point of the engine by a predetermined range, and
    the controller determines the shifting pattern to be the normal shifting pattern, and only when a temperature of a catalyst of a catalyst converter is equal to or higher than a predetermined temperature, the controller controls the shifting pattern to be a catalyst protecting normal shifting pattern.

3. The apparatus of claim 1, wherein when the SOC of the battery is in a high region,
    the controller controls the travelling mode to be an Electric Vehicle (EV) mode, and only when the required torque of the driver exceeds a maximum torque of the driving motor, the controller controls the travelling mode to be a Hybrid Electric Vehicle (HEV) mode,
    when the travelling mode is the HEV mode, the controller controls the operating point of the engine to be the optimal operating line that means an optimal operating point of the engine, and
    the controller determines the shifting pattern to be the normal shifting pattern, and only when a temperature of a catalyst of a catalyst converter is equal to or higher than a predetermined temperature, the controller controls the shifting pattern to be a catalyst protecting normal shifting pattern.

4. The apparatus of claim 1, wherein when the SOC of the battery is in a normal discharge region,
    the controller controls the travelling mode such that an EV mode takes priority over an HEV mode,
    when the travelling mode is the HEV mode, the controller controls the operating point of the engine to be the optimal operating line,
    the lock charge in a coasting state is performed in the case where the vehicle travels on an uphill road, and
    the controller determines the shifting pattern to be the normal shifting pattern, and only when a temperature of a catalyst of a catalyst converter is equal to or higher than a predetermined temperature, the controller controls the shifting pattern to be a catalyst protecting normal shifting pattern.

5. The apparatus of claim 1, wherein when the SOC of the battery is in a normal charge region,
    the controller controls the travelling mode such that an HEV mode takes priority over an EV mode,
    in the case where the travelling mode is the HEV mode, when the required torque of the driver is in a high torque region, the controller controls the operating point of the engine to be the EGR max line, and when the required torque of the driver is in a low torque region that is lower than the high torque region, the controller controls the operating point of the engine to be the optimal operating line,
    the lock charge in a coasting state is performed in the case where the vehicle travels a flat road and on an uphill road, and
    the controller determines the shifting pattern to be the normal shifting pattern, and only when a temperature of a catalyst of a catalyst converter is equal to or higher than a predetermined temperature, the controller controls the shifting pattern to be a catalyst protecting normal shifting pattern.

6. The apparatus of claim 1, wherein when the SOC of the battery is in a low region, the controller controls the travelling mode to be an HEV mode, in the case where the travelling mode is the HEV mode, when the required torque of the driver is in a high torque region, the controller controls the operating point of the engine to be the part-load max line, and when the required torque of the driver is in a low torque region that is lower than the high torque region, the controller controls the operating point of the engine to be the optimal operating line, the lock charge in a coasting state is performed in the case where the vehicle travels on a downhill road, a flat road, and on an uphill road, and the controller determines the shifting pattern to be the normal shifting pattern, and only when a temperature of a catalyst of a catalyst converter is equal to or higher than a predetermined temperature, the controller controls the shifting pattern to be a catalyst protecting low shifting pattern.

7. The apparatus of claim 1, wherein when the SOC of the battery is in a low region, the controller controls the travelling mode to be an HEV mode, in the case where the travelling mode is the HEV mode, when the required torque of the driver is in a high torque region, the controller controls the operating point of the engine to be the part-load max line, and when the required torque of the driver is in a low torque region that is lower than the high torque region, the controller controls the operating point of the engine to be the optimal operating line, and when the vehicle travels under a high load condition for a predetermined time or longer, the controller controls the operating point of the engine to be a catalyst protecting temperature line, the lock charge in a coasting state is performed in the case where the vehicle travels a flat road and on an uphill road, and the controller determines the shifting pattern to be the normal shifting pattern, and only when a temperature of a catalyst of a catalyst converter is equal to or higher than a predetermined temperature, the controller controls the shifting pattern to be a catalyst protecting low shifting pattern.

8. The apparatus of claim 1, wherein when the SOC of the battery is in a critical low region, the controller controls the travelling mode to be an HEV mode, when the required torque of the driver is in a high torque region, the controller controls the operating point of the engine to be the full-load max line, and when the required torque of the driver is in a low torque region that is lower than the high torque region, the controller controls the operating point of the engine to be the optimal operating line, when the vehicle is stopping, the controller operates the engine to perform an idle charge, the controller controls the lock charge in a coasting state to be always performed, and the controller determines the shifting pattern to be the normal shifting pattern, and only when a temperature of a catalyst of a catalyst converter is equal to or higher than a predetermined temperature, the controller controls the shifting pattern to be a catalyst protecting low shifting pattern.

9. A method of controlling a hybrid vehicle, the method comprising:

determining a State of Charge (SOC) of a battery and a required torque of a driver; and variably controlling a travelling mode of the hybrid vehicle through an engine and a driving motor of the hybrid vehicle, an operating point of the engine, a lock charge condition through the driving motor and a hybrid starter and generator (HSG), and a shifting pattern based on the required torque of the driver and the determined SOC of the battery, wherein the engine is controlled with an operating point of any one among an optimal operating line (OOL), an exhaust gas recirculation (EGR) max line, a catalyst protecting line, a part-load max line, or a full-load max line based on an SOC of the battery and a torque requirement of a driver, and wherein the shifting pattern is divided into a normal shifting pattern determined according to a current speed of the vehicle and the torque requirement of the driver and into a catalyst protection shifting pattern including a catalyst protection normal shifting pattern and a catalyst protection low shifting pattern according to the SOC of the battery.

10. The method of claim 9, wherein when the SOC of the battery is in a critical high region, the travelling mode is controlled to be an Electric Vehicle (EV) mode, and only when the required torque of the driver exceeds a maximum torque of the driving motor, the travelling mode is controlled to be a Hybrid Electric Vehicle (HEV) mode, when the travelling mode is the HEV mode, the operating point of the engine is controlled to output an engine torque lower than the optimal operating line that means an optimal operating point of the engine by a predetermined range, and the shifting pattern is determined to be the normal shifting pattern, and only when a temperature of a catalyst of a catalyst converter is equal to or higher than a predetermined temperature, the shifting pattern is controlled to be a catalyst protecting normal shifting pattern.

11. The method of claim 9, wherein when the SOC of the battery is in a high region, the travelling mode is controlled to be an EV mode, and only when the required torque of the driver exceeds a maximum torque of the driving motor, the travelling mode is controlled to be an HEV mode, when the travelling mode is the HEV mode, the operating point of the engine is controlled to be the optimal operating line that means an optimal operating point of the engine, and the shifting pattern is determined to be the normal shifting pattern, and only when a temperature of a catalyst of a catalyst converter is equal to or higher than a predetermined temperature, the shifting pattern is controlled to be a catalyst protecting normal shifting pattern.

12. The method of claim 9, wherein when the SOC of the battery is in a normal discharge region, the travelling mode is controlled such that an EV mode takes priority over an HEV mode, when the travelling mode is the HEV mode, the operating point of the engine is controlled to be the optimal operating line, the lock charge in a coasting state is performed in the case where the vehicle travels on an uphill road, and the shifting pattern is determined to be the normal shifting pattern, and only when a temperature of a catalyst of a catalyst converter is equal to or higher than a predetermined temperature, the shifting pattern is controlled to be a catalyst protecting normal shifting pattern.

13. The method of claim 9, wherein when the SOC of the battery is in a normal charge region, the travelling mode is controlled such that an HEV mode takes priority over an EV mode, in the case where the travelling mode is the HEV mode, when the required torque of the driver is in a high torque region, the operating point of the engine is controlled to be the EGR max line, and when the required torque of the driver is in a low torque region that is lower than the high torque region, the operating point of the engine is controlled to be the optimal operating line, the lock charge in a coasting state is performed in the case where the vehicle travels a flat road and on an uphill road, and the shifting pattern is determined to be the normal shifting pattern, and only when a temperature of a catalyst of a catalyst converter is equal to or higher than a predetermined temperature, the shifting pattern is controlled to be a catalyst protecting normal shifting pattern.

14. The method of claim 9, wherein when the SOC of the battery is in a low region, the travelling mode is controlled to be an HEV mode, in the case where the travelling mode is the HEV mode, when the required torque of the driver is in a high torque region, the operating point of the engine is controlled to be the part-load max line, and when the required torque of the driver is in a low torque region that is lower than the high torque region, the operating point of the engine is controlled to be the optimal operating line, the lock charge in a coasting state is performed in the case where the vehicle travels on a downhill road, a flat road, and on an uphill road, and the shifting pattern is determined to be the normal shifting pattern, and only when a temperature of a catalyst of a catalyst converter is equal to or higher than a predetermined temperature, the shifting pattern is controlled to be a catalyst protecting low shifting pattern.

15. The method of claim 9, wherein when the SOC of the battery is in a low region, the travelling mode is controlled to be an HEV mode, in the case where the travelling mode is the HEV mode, when the required torque of the driver is in a high torque region, the operating point of the engine is controlled to be the part-load max line, and when the required torque of the driver is in a low torque region that is lower than the high torque region, the operating point of the engine is controlled to be the optimal operating line, and when the vehicle travels under a high load condition for a predetermined time or longer, the operating point of the engine is controlled to be a catalyst protecting temperature line, the lock charge in a coasting state is performed in the case where the vehicle travels a flat road and on an uphill road, and the shifting pattern is determined to be the normal shifting pattern, and only when a temperature of a catalyst of a catalyst converter is equal to or higher than a predetermined temperature, the shifting pattern is controlled to be a catalyst protecting low shifting pattern.

16. The method of claim 9, wherein when the SOC of the battery is in a critical low region, the travelling mode is controlled to be an HEV mode, when the required torque of the driver is in a high torque region, the operating point of the engine is controlled to be the full-load max line, and when the required torque of the driver is in a low torque region that is lower than the high torque region, the operating point of the engine is controlled to be the optimal operating line, when the vehicle is stopping, an idle charge is performed by operating the engine, the lock charge in a coasting state is controlled to be always performed, and the shifting pattern is determined to be the normal shifting pattern, and only when a temperature of a catalyst of a catalyst converter is equal to or higher than a predetermined temperature, the shifting pattern is controlled to be a catalyst protecting low shifting pattern.

* * * * *